(12) United States Patent
Hiri et al.

(10) Patent No.: US 7,123,707 B1
(45) Date of Patent: Oct. 17, 2006

(54) METHODS OF CONTROLLING COMMUNICATIONS WITH AT LEAST TWO CALLING PARTY DEVICES BY A USER OF A CALLED PARTY DEVICE

(75) Inventors: Farzad Hiri, Plano, TX (US); Mark Peck, Plano, TX (US); Adam Roach, Dallas, TX (US)

(73) Assignee: Ericsson Inc., Plano, TX (US)

( * ) Notice: Subject to any disclaimer, the term of this patent is extended or adjusted under 35 U.S.C. 154(b) by 568 days.

(21) Appl. No.: 09/643,621

(22) Filed: Aug. 22, 2000

(51) Int. Cl.
*H04M 3/42* (2006.01)

(52) U.S. Cl. .............................. 379/215.01; 379/88.13; 379/88.17; 379/68; 379/393; 709/206

(58) Field of Classification Search ................ 379/142, 379/8, 197, 215.01, 67.1, 88.11, 88.12, 88.17, 379/88.19, 93.35, 201.01, 201.02, 201.11, 379/201.12, 265.09, 68, 88.1, 393; 370/352; 455/412.1
See application file for complete search history.

(56) References Cited

U.S. PATENT DOCUMENTS

| | | | |
|---|---|---|---|
| 5,557,658 A | * | 9/1996 | Gregorek et al. ........ 379/88.25 |
| 5,946,386 A | * | 8/1999 | Rogers et al. ......... 379/265.09 |
| 5,974,131 A | | 10/1999 | Malik |
| 6,052,438 A | | 4/2000 | Wu et al. |
| 6,122,346 A | * | 9/2000 | Grossman ................. 379/68 |
| 6,160,877 A | * | 12/2000 | Tatchell et al. ............. 379/197 |
| 6,167,119 A | * | 12/2000 | Bartholomew et al. .. 379/88.04 |
| 6,219,413 B1 | * | 4/2001 | Burg ..................... 379/215.01 |
| 6,404,860 B1 | * | 6/2002 | Casellini .................. 379/88.17 |
| 6,498,841 B1 | * | 12/2002 | Bull et al. ............. 379/142.08 |
| 6,577,859 B1 | * | 6/2003 | Zahavi et al. ............ 455/412.1 |
| 6,724,872 B1 | * | 4/2004 | Moore et al. ............ 379/93.35 |
| 2003/0021264 A1 | * | 1/2003 | Zhakov et al. ............... 370/352 |

* cited by examiner

*Primary Examiner*—Fan Tsang
*Assistant Examiner*—Md S. Elahee
(74) *Attorney, Agent, or Firm*—Roger S. Burleigh

(57) ABSTRACT

Methods, and communications devices employing such methods, of controlling communications with at least two calling party devices by a user of a called party device. A first call link is established between a called party device and a first calling party device. The called party device then receives a call request from a second calling party device; e.g., a call-waiting indication. A user of the called party device places the first call link on hold, and accepts the call request from the second calling party device to establish a second call link between the called party device and the second calling party device. While the user of the called party device is in communication with the user of the second calling party device, the user can cause a message to be transmitted to the first calling party device, whereby the user of the called party device can communicate information to a user of the first calling party device without interrupting communications with a user of the second calling party device. A message to the first calling party device can, for example, instruct the user to hang up, continue to hold, or leave a message for the user of the called party device.

33 Claims, 3 Drawing Sheets

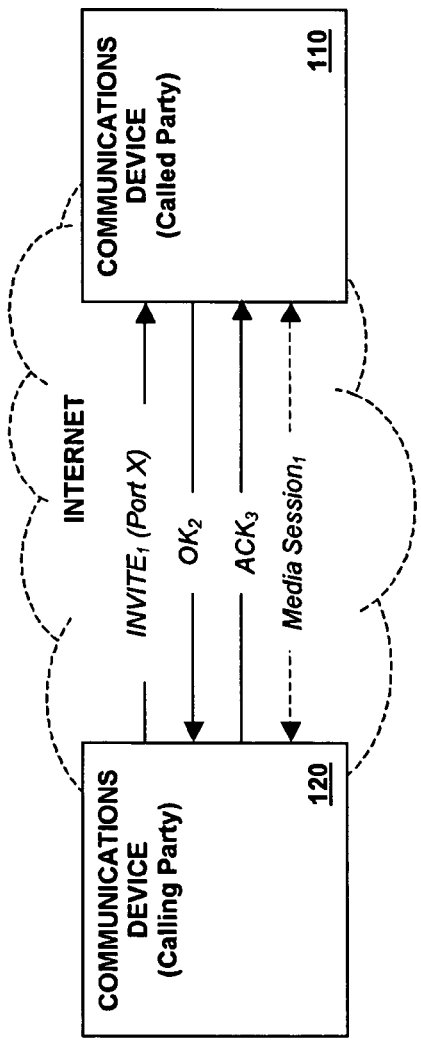
FIG. 1-A
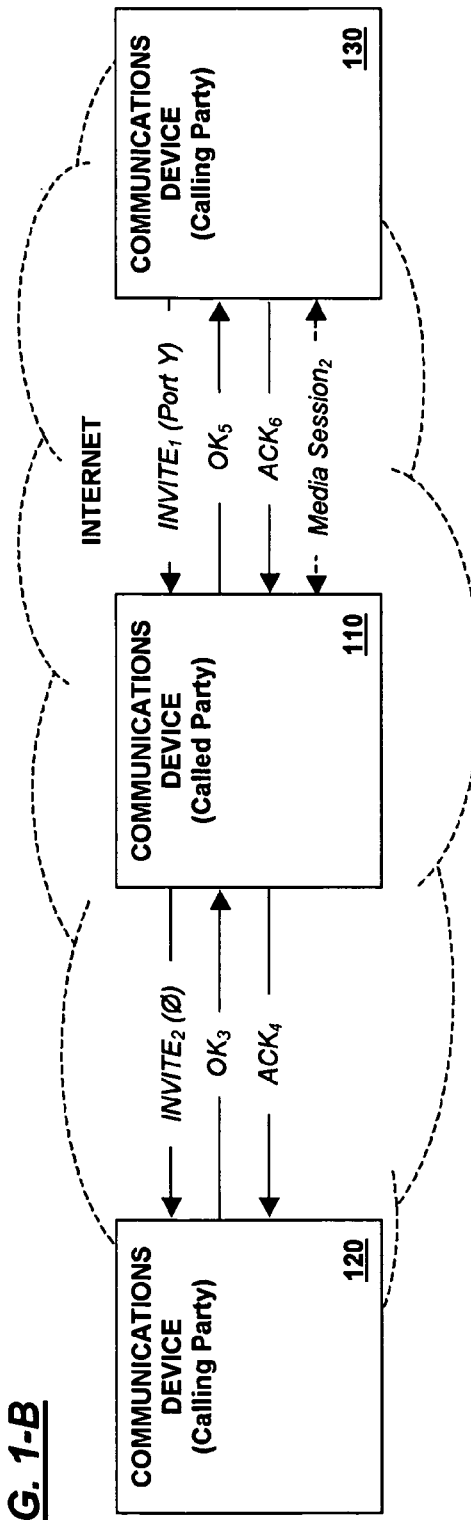
FIG. 1-B

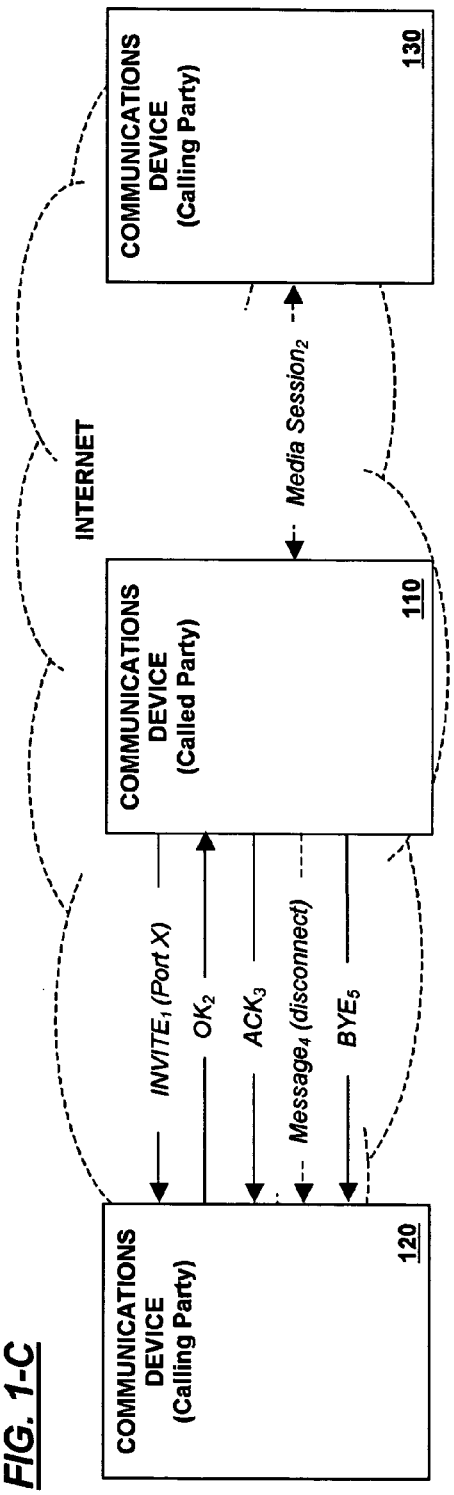
*FIG. 1-C*
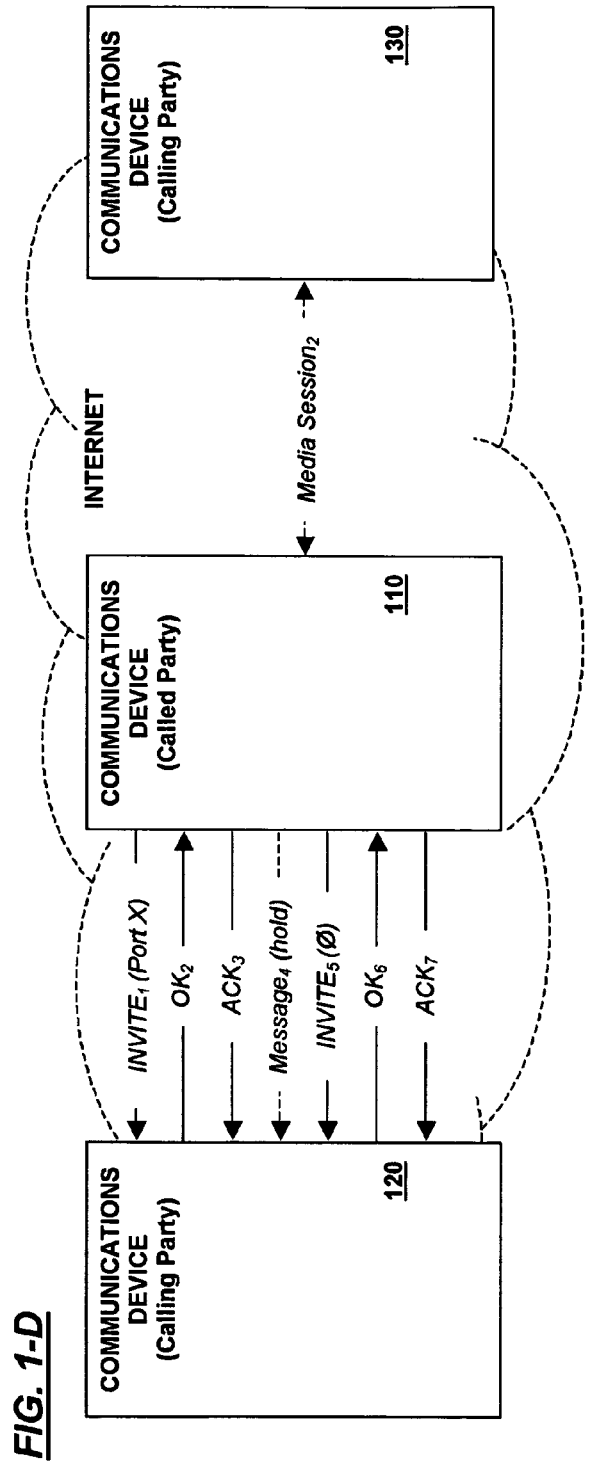
*FIG. 1-D*

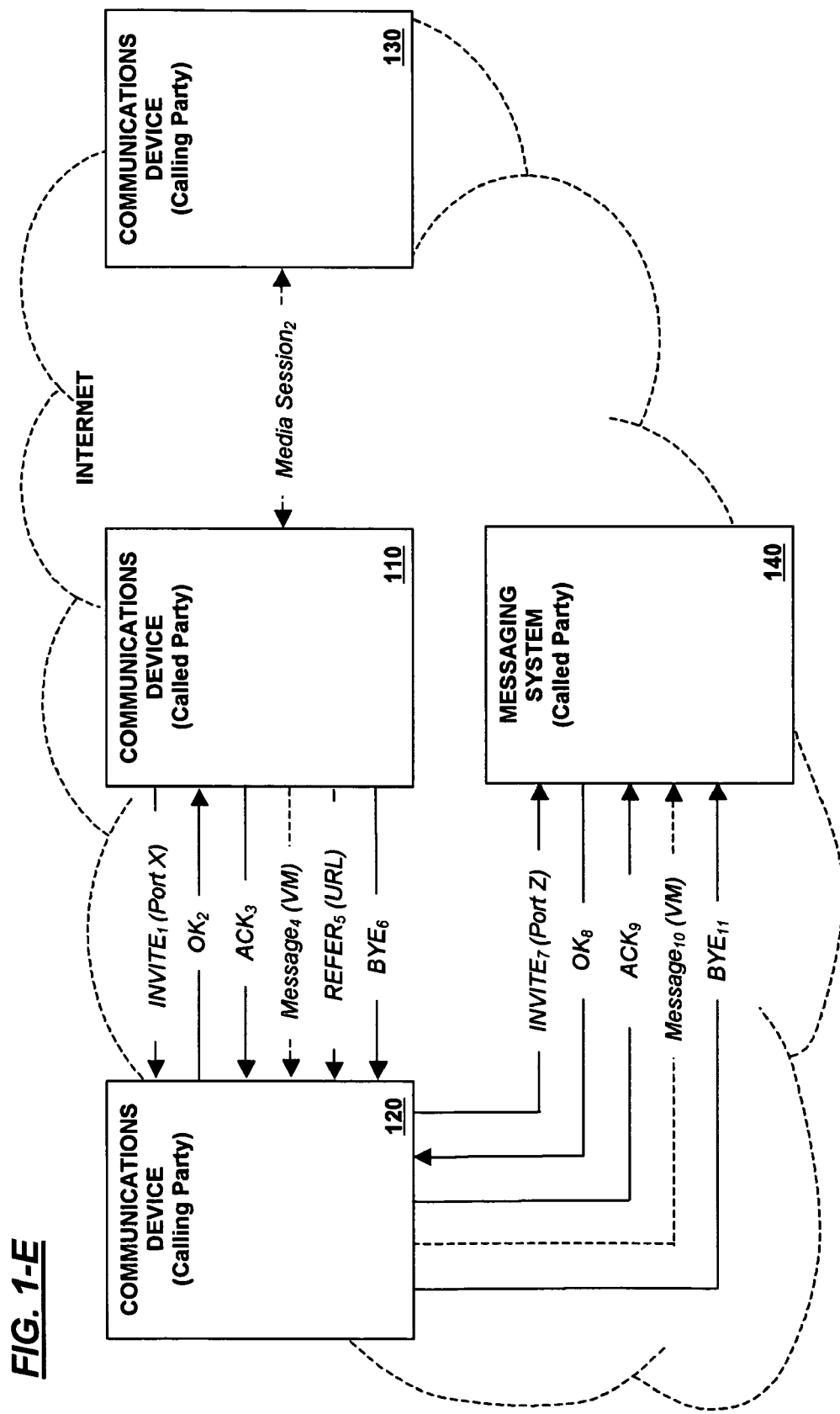
FIG. 1-E

METHODS OF CONTROLLING COMMUNICATIONS WITH AT LEAST TWO CALLING PARTY DEVICES BY A USER OF A CALLED PARTY DEVICE

TECHNICAL FIELD OF THE INVENTION

The present invention is directed, in general, to communications systems and, more specifically, to methods of controlling communications with at least two calling party devices by a user of a called party device.

BACKGROUND OF THE INVENTION

The world is currently experiencing revolutionary changes in communications systems, brought about, in part, by the evolution of the Internet. Conventional communications systems, however, such as the Public Switched Telephone Network (PSTN), are also undergoing revolutionary changes to bring enhanced services to subscribers.

Intelligent Network (IN) services refers generally to a collection of services offered to PSTN telephony system subscribers on a pre-subscribed basis, such as Calling Number Delivery, Calling Number Blocking, Customer Originated Trace, Automatic Recall, Automatic Callback, Selective Call Forwarding, Call Waiting, Selective Call Waiting, Selective Call Rejection, and Selective Call Acceptance. The collection of IN services is continually growing as telecommunications system engineers devise both improved and novel systems and processes for providing advanced services. The medium for providing communications services, however, is gradually transitioning from the circuit-switched PSTN networks to packet-switched networks, such as the Internet, and, thus, it is desirable to provide similar services in packet-switched communications environments.

One particularly popular IN service is Call Waiting. If a subscriber to the service is engaged in a call, and a call from another party is received, the subscriber receives an indication, such as an audible tone. The subscriber can, if desired, place the first call on hold and connect to the second call. After connecting to the second call, the subscriber can then alternate between the first and second calls, as desired. Although the Call Waiting IN services has become very popular, it has the disadvantage of only allowing a subscriber to communicate with one calling party at a time. For example, if, after connecting to the second call, the subscriber desires to tell the first caller that the subscriber needs to continue with the second call, the subscriber must place the second call on hold to reconnect to the first call, inform the first caller of this need, and then reconnect to the second call. This may be undesirable if, for example, the second call is long distance, extremely urgent, or the subscriber doesn't wish the second caller to know that the subscriber was on another call.

Accordingly, there is a need in the art for methods for providing an enhanced Call Waiting service that allows a subscriber to communicate with a first calling party without interrupting communications with a second calling party. There is a further need in the art for providing such enhanced Call Waiting service within a packet-switched communications network, such as the Internet.

SUMMARY OF THE INVENTION

To address the above-discussed deficiencies of the prior art, the present invention relates to methods, and communications devices employing such methods, of controlling communications with at least two calling party devices by a user of a called party device. In general, a first call link is established between a called party device and a first calling party device. The called party device then receives a call request from a second calling party device; e.g., a call-waiting indication. A user of the called party device places the first call link on hold, and accepts the call request from the second calling party device to establish a second call link between the called party device and the second calling party device. While the user of the called party device is in communication with the user of the second calling party device, the user can cause a message to be transmitted to the first calling party device, whereby the user of the called party device can communicate information to a user of the first calling party device without interrupting communications with a user of the second calling party device. A message to the first calling party device can, for example, instruct the user to hang up, continue to hold, or leave a message for the user of the called party device.

In certain embodiments, the message transmitted to the first calling party device is a prerecorded voice message. A user of the called party device can select a desired predefined message using an input mechanism associated with the called party device, e.g., a telephone keypad or computer keyboard. In alternative embodiments, a user of the called party device can generate a text message using an input mechanism, such as a computer keyboard, associated with the called party device. The text message can be transmitted to the first calling party device for viewing on a display, if available, or the text message can be converted to speech.

As used herein, a "communications device" is broadly defined to include conventional telephony devices having only a user-input mechanism, such as a keypad, as well as general- or specific-based telephony or computing devices having a keypad (or keyboard) and display screen associated therewith. Furthermore, a communications device can be a wireline or wireless device. The principles of the present invention are adaptable to both circuit-switched and packet-switched communications networks. In a packet-switched communications network, such as the Internet, the principles of the present invention can be implemented, for example, using the Internet Engineering Task Force (IETF) Session Initiation Protocol (SIP); see, for example, IETF Request for Comments (RFC) 2543, © The Internet Society (1999), incorporated herein by reference.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which:

FIG. 1-A illustrates an exemplary signaling diagram for establishing a call session between a calling party and called party communications devices using an Internet Engineering Task Force (IETF) Session Initiation Protocol (SIP);

FIG. 1-B illustrates an exemplary SIP signaling diagram for receiving a request for, and the establishment of, a second call session with a second calling party to communications device;

FIG. 1-C illustrates an exemplary SIP signaling diagram for causing a "disconnect" message to be transmitted to a first calling party communications device while a called party communications device is in communication with a second calling party communications device;

FIG. 1-D illustrates an exemplary SIP signaling diagram for causing a "hold" message to be transmitted to a first calling party communications device while a called party communications device is in communication with a second calling party communications device; and FIG. 1-E illustrates an exemplary SIP signaling diagram for causing a "leave voicemail" message to be transmitted to a first calling party communications device while a called party communications device is in communication with a second calling party communications device.

DETAILED DESCRIPTION

As previously noted, the principles of the present invention are adaptable to both packet-switched and circuit-switched communications networks, such as the Internet and the Public Switched Telephone Network (PSTN), respectively. The following description discloses a specific implementation based on the Internet Engineering Task Force (IETF) Session Initiation Protocol (SIP).

In general, a first call link is established between a called party device and a first calling party device; in packet-switched network environments, a call link is alternately referred to as a "call session" or "media session." The establishment of a first call session, using SIP signaling, is illustrated in FIG. 1-A, described hereinafter. The called party device then receives a call request from a second calling party device; e.g., a "call-waiting" indication. A user of the called party device places the first call session on hold, and accepts the call request from the second calling party device to establish a second call session between the called party device and the second calling party device. The receipt of the request for, and establishment of, the second call session, using SIP signaling, is illustrated in FIG. 1-B, described hereinafter. While the user of the called party device is in communication with the user of the second calling party device, the user can cause a message to be transmitted to the first calling party device, whereby the user of the called party device can communicate information to a user of the first calling party device without interrupting communications with a user of the second calling party device. A message to the first calling party device can, for example, instruct the user to hang up (or "disconnect"), continue to hold, or leave a voicemail for the user of the called party device. The transmission of a "disconnect," "hold," or "leave voicemail" message, using SIP signaling, is illustrated in FIGS. 1-C, 1-D and 1-E, respectively, described hereinafter. In FIGS. 1-A through 1-E, signals between communications devices are illustrated with numeric subscripts that indicate the relative order in which the signals are transmitted.

Referring to FIG. 1-A, illustrated is an exemplary SIP signaling diagram for establishing a first call session between a calling party communications device 120 and called party communications devices 110. To initiate the establishment of the first call session, calling party communications device 120 sends an INVITE message ($INVITE_1$) to called party communications device 110. It should be noted that, although communications device 120 is referred to as a "calling party" device and communications device 110 is referred to as a "called party device," it is not material whether one device or the other initiates the call session; for the reverse case, the direction of all signals shown in FIG. 1-A are simply reversed. The INVITE message can include a "session description" that includes a port designator (Port X) to identify a Real Time Protocol (RTP) port through which the call session (or "Media Session") between the communications devices is to be established; alternatively, the RTP port can be designated by the called party communications device 110 in a response message.

After receipt of the INVITE message ($INVITE_1$), called party communications device 110 sends an OK message ($OK_2$) to calling party communications device 120 to confirm the request for a call session. Calling party communications device 120 then acknowledges the confirmation message ($OK_2$) received from called party communications device 110 by sending an acknowledgement message ($ACK_3$), and the users of calling party and called party communications devices 120, 110 can begin communicating through the established media session (Media $Session_1$).

Referring now to FIG. 1-B, illustrated is an exemplary SIP signaling diagram for receiving a request for, and establishing, a second call session (Media $Session_2$) with a second calling party communications device 130. To initiate the establishment of the second call session, calling party communications device 130 sends an INVITE message ($INVITE_1$) to called party communications device 110. As previously described, an INVITE message can include a "session description" that includes a port designator (e.g., Port Y) to identify a RTP port through which the call session (or "Media Session") between the communications devices is to be established; alternatively, the RTP port can be designated by the called party communications device 110 in a response message.

After receipt of the INVITE message ($INVITE_1$), called party communications device 110 can alert a user thereof of the incoming call request, for example, by generating an audible tone. If the user desires to accept the incoming call request from calling party communications device 130, the first call session (Media $Session_1$) with calling party communications device 120 must be placed on hold. To place the first call session on hold, called party communications device 110 sends an INVITE message ($INVITE_2$), also referred to as a "re-INVITE" message, to calling party communications device 120; the re-INVITE message ($INVITE_2$) includes a session description that identifies a null ("Ø") RTP port; for example, if the communications medium uses an Internet Protocol (IP) addressing scheme, a "null" port could be defined as an address of 0.0.0.0. Calling party communications device 120 confirms receipt of the re-INVITE message ($INVITE_2$) by sending an OK message ($OK_3$) to called party communications device 110, which then sends an acknowledgement message ($ACK_4$) back to calling party communications device 120. Because the session description for communications between called party communications device 110 and calling party communications device 120 now identifies a null RTP port, the previously established media session (Media $Session_1$), illustrated in FIG. 1-A, is now effectively suspended (or, "on hold").

Once the previously established media session (Media $Session_1$) between called party communications device 110 and calling party communications device 120 has been placed on hold, called party communications device 110 can return to the process of established a media session with calling party communications device 130. To do this, called party communications device 110 sends an OK message (OK$_5$) to calling party communications device 130 to confirm the request for a call session. Calling party communications device 130 then acknowledges the confirmation message (OK$_5$) received from called party communications device 110 by sending an acknowledgement message (ACK$_6$), and the users of calling party and called party communications devices 130, 110 can begin communicating through the established media session (Media Session$_2$).

It will be appreciated by those of ordinary skill in the art that the process of placing the first call session (Media Session$_1$) on hold, and establishing the second call session (Media Session$_2$), can be initiated by a user of called party communications device 110 simply by using an input mechanism, such as a keypad, associated therewith. For example, upon receipt of the INVITE message (INVITE$_1$) from calling party communications device 130, a user of called party communications device 110 can trigger performance of the described SIP signals by depressing one or more keys on a keypad or keyboard; with conventional telephony devices, this is analogous to a "flash" or "flashhook" used in the PSTN to alternate between calls.

At this point, the user of called party communications device 110 is communicating with the user of calling party communications device 130 through Media Session$_2$, while the previously established media session (Media Session$_1$) between called party communications device 110 and calling party communications device 120 has been placed "on hold;" i.e., the RTP port assigned to the media session has been set to a null port. As previously noted, conventional Call Waiting services provided by the PSTN allow a subscriber to alternate between first and second calls, as desired; e.g., by using a "flash" key on the subscriber's terminal. This capability, however, has the disadvantage of only allowing a subscriber to communicate with one calling party at a time. For example, if the user of called party communications device 110 desires to tell the user of calling party communications device 120 that the user needs to continue with the second call from the user of calling party communications device 130, the user must place the second call on hold to reconnect to the first call, inform the first calling party of this need, and then reconnect to the second call. This may be undesirable if, for example, the second call from calling party communications device 130 is a long distance call, extremely urgent, or the user doesn't wish the second caller to know that the user was on another call. The principles of the present invention overcome this limitation of the prior art by providing a mechanism for a user of called party communications device 110 to transmit a message to calling party communications device 120 without interrupting the call session (Media Session$_2$) with calling party communications device 130. Three examples of such messages are described with reference to FIGS. 1-C, 1-D and 1-E.

Referring to FIG. 1-C, illustrated is an exemplary SIP signaling diagram for causing a "disconnect" message to be transmitted to a first calling party communications device 120 while a called party communications device 110 is in communication with a second calling party communications device 130. In this example, the user of called party communications device 110 desires to terminate the call session with the user of calling party communications device 120 after transmitting a message to the user of calling party communications device 120. To do this, called party communications device 110 sends an INVITE message (INVITE$_1$), also referred to as a "re-INVITE" message, to calling party communications device 120; the re-INVITE message (INVITE$_1$) can include a session description that identifies an RTP port through which the message will be directed (e.g., Port X). Calling party communications device 120 confirms receipt of the re-INVITE message (INVITE$_1$) by sending an OK message (OK$_2$) to called party communications device 110, which then sends an acknowledgement message (ACK$_3$) back to calling party communications device 120. The called party communications device 110 then transmits a message, Message$_4$ (disconnect), over a media session link identified in the session description (e.g., RTP Port X), followed by the transmission of a BYE message (BYE$_5$) that terminates the media session temporarily established for transmission of the message.

The message, Message$_4$ (disconnect), can be, for example, a prerecorded audio message, such as: "I'm sorry, but I need to take another call at this time; please hang up and I will call you back as soon as possible." A user of called party communications device 110 can initiate the process of causing the message to be transmitted, for example, simply by using an input mechanism, such as a keypad, associated therewith. For example, after establishing the call session (Media Session$_2$) with calling party communications device 130, a user of called party communications device 110 can trigger performance of the described SIP signals, and transmission of the message, Message$_4$ (disconnect), by depressing one or more keys on a keypad or keyboard. Alternatively, in embodiments in which the called party communications device 110 includes a keyboard and display, such as a computer-based telephony device, the message can be a custom text message input using the keyboard, such as: "I'm sorry, Bob, but my boss is on the other line; I'll call you back." Such custom messages could be input and sent by the user of called party communications device 110 while simultaneously in voice communication via Media Session$_2$ with a user of calling party communications device 130. The transmission of a text message, however, assumes that the calling party communications device 120 has the capability to display the message; the capabilities of each communications device, however, can be provided in the session description information that is shared by the devices while establishing the media session. If the calling party communications device 120 does not have a text display capability, the custom text message input by the user of called party communications device 110 can be converted to speech using techniques known in the art, and the converted-speech message can then be transmitted to calling party communications device 120.

Referring to FIG. 1-D, illustrated is an exemplary SIP signaling diagram for causing a "hold" message to be transmitted to a first calling party communications device 120 while a called party communications device 110 is in communication with a second calling party communications device 130. In this example, the user of called party communications device 110 desires the user of calling party communications device 120 to hold until the call with calling party communications device 130 can be finished. To do this, called party communications device 110 sends an INVITE message (INVITE$_1$), also referred to as a "re-INVITE" message, to calling party communications device 120; the re-INVITE message (INVITE$_1$) can include a session description that identifies an RTP port through which the message will be directed (e.g., Port X). Calling party communications device 120 confirms receipt of the re-INVITE message (INVITE$_1$) by sending an OK message (OK$_2$) to called party communications device 110, which then sends an acknowledgement message (ACK$_3$) back to calling party communications device 120. The called party communications device 110 then transmits a message, Message$_4$ (hold), over a media session link identified in the session description (e.g., RTP Port X).

After the message, Message$_4$ (hold), has been sent, called party communications device 110 places the call session with calling party communications device 120 back in a "hold" state. To place the call session on hold, called party communications device 110 sends an INVITE message (INVITE$_5$), also referred to as a "re-INVITE" message, to calling party communications device 120; the re-INVITE message (INVITE$_5$) includes a session description that identifies a null ("Ø") RTP port. Calling party communications device 120 confirms receipt of the re-INVITE message (INVITE$_5$) by sending an OK message (OK$_6$) to called party communications device 110, which then sends an acknowledgement message (ACK$_7$) to calling party communications device 120. Because the session description for the call session between called party communications device 110 and calling party communications device 120 now identifies a null RTP port, the call session is now effectively suspended (or, "on hold").

The message, Message$_4$ (hold), can be, for example, a prerecorded audio message, such as: "I'm sorry; please hold and I will be with you as soon as possible." A user of called party communications device 110 can initiate the process of causing the message to be transmitted, for example, simply by using an input mechanism, such as a keypad, associated therewith. For example, after establishing the call session (Media Session$_2$) with calling party communications device 130, a user of called party communications device 110 can trigger performance of the described SIP signals, and transmission of the message, Message$_4$ (hold), by depressing one or more keys on a keypad or keyboard. Alternatively, in embodiments in which the called party communications device 110 includes a keyboard and display, such as a computer-based telephony device, the message can be a custom text message input using the keyboard, such as: "I'm sorry, Bob, but my boss is on the other line; please hold." As previously noted, a custom message can be input and sent by the user of called party communications device 110 while simultaneously in voice communication via Media Session$_2$ with a user of calling party communications device 130; depending on the media capabilities of calling party communications device 120, the custom message can be transmitted in either a text format or converted to a speech format.

Referring to FIG. 1-E, illustrated is an exemplary SIP signaling diagram for causing a "leave voicemail" message to be transmitted to a first calling party communications device 120 while a called party communications device 110 is in communication with a second calling party communications device 130. In this example, the user of called party communications device 110 desires to terminate the call session with the user of calling party communications device 120 after transmitting a message that requests the user of calling party communications device 120 to leave a voicemail message. To do this, called party communications device 110 sends an INVITE message (INVITE$_1$), also referred to as a "re-INVITE" message, to calling party communications device 120; the re-INVITE message (INVITE$_1$) can include a session description that identifies an RTP port through which the message will be directed (e.g., Port X). Calling party communications device 120 confirms receipt of the re-INVITE message (INVITE$_1$) by sending an OK message (OK$_2$) to called party communications device 110, which then sends an acknowledgement message (ACK$_3$) to calling party communications device 120. The called party communications device 110 then transmits a message, Message$_4$ (VM), over a media session link identified in the session description (e.g., RTP Port X).

The message, Message$_4$ (VM), can be, for example, a prerecorded audio message, such as: "I'm sorry; but I need to take another call at this time; please hold and you will be transferred to my voicemail system where you can leave me a message." A user of called party communications device 110 can initiate the process of causing the message to be transmitted, for example, simply by using an input mechanism, such as a keypad, associated therewith. For example, after establishing the call session (Media Session$_2$) with calling party communications device 130, a user of called party communications device 110 can trigger performance of the described SIP signals, and transmission of the message, Message$_4$ (VM), by depressing one or more keys on a keypad or keyboard. Alternatively, in embodiments in which the called party communications device 110 includes a keyboard and display, such as a computer-based telephony device, the message can be a custom text message input using the keyboard, such as: "I'm sorry, Bob, but my boss is on the other line; please hold and you will be transferred to my voicemail system where you can leave me a message." As previously noted, a custom message can be input and sent by the user of called party communications device 110 while simultaneously in voice communication via Media Session$_2$ with a user of calling party communications device 130; depending on the media capabilities of calling party communications device 120, the custom message can be transmitted in either a text format or converted to a speech format.

After the message, Message$_4$ (VM), is sent to calling party communications device 120, called party communications device 110 sends a REFER message (REFER$_5$). The REFER message (REFER$_5$) sent by called party communications device 110 can include an address that identifies the messaging system 140 associated with the user of called party communications device 110; the address can be, for example, a Uniform Resource Locator (URL) address. Called party communications device 110 then terminates the media session with calling party communications 120 by sending a BYE message (BYE$_6$) that terminates the media session temporarily established for transmission of the message.

Using the URL address provided by the REFER message (REFER$_5$), calling party communications device 120 sends an INVITE message (INVITE$_7$) to called party messaging system 140; the INVITE message (INVITE$_7$) can include a session description that identifies an RTP port through which the message will be directed (e.g., Port Z). Called party messaging system 140 confirms receipt of the INVITE message (INVITE$_7$) by sending an OK message (OK$_8$) to calling party communications device 120, which then sends an acknowledgement message (ACK$_9$) to called party messaging system 140. At this point, a media session has been established between calling party communications device 120 and called party messaging system 140. The user of calling party communications device 120 can then speak the message, Message$_{10}$ (VM), to be recorded by called party messaging system 140. When the user of calling party communications device 120 has finished leaving the message, the media session established between calling party communications device 120 and called party messaging system 140 can be terminated, for example, by the transmission of a BYE message (BYE$_{11}$) from calling party communications device 120 to called party messaging system 140.

From the foregoing, those skilled in the art will recognize that the present invention provides significant advantages to communications systems, by providing an enhanced service that allows a subscriber to communicate with a first calling party without interrupting communications with a second calling party. Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method of controlling communications with at least two calling party devices by a user of a called party device, said method comprising the steps of:
   establishing a first call link between said called party device and a first calling party device;
   receiving a call request to said called party device from a second calling party device;
   placing said first call link on hold;
   accepting said call request from said second calling party device to establish a second call link between said called party device and said second calling party device;
   causing, through the selective activation by said user of said called party device, a message to be transmitted to said first calling party device, said step of causing a message to be transmitted to said first calling party device comprising the step of said user selecting one of a plurality of predefined messages using an input mechanism associated with said called party device while said called party device is in communication with said second calling party device, whereby said user of said called party device can communicate information to a user of said first calling party device without interrupting communications with a user of said second calling party device.

2. The method recited in claim 1, wherein said message instructs said user of said first calling party device to hold.

3. The method recited in claim 1, wherein said message instructs said user of said first calling party device that said call link to said called party device will be disconnected.

4. The method recited in claim 3, further comprising the step of automatically causing said first call link to be terminated.

5. The method recited in claim 1, wherein said message instructs said user of said first calling party device to leave a message.

6. The method recited in claim 4, further comprising the step of automatically causing said first calling party device to be connected to a messaging system associated with said user of said called party device.

7. The method recited in claim 1, wherein said message comprises a prerecorded voice message.

8. The method recited in claim 1, wherein said step of causing a message to be transmitted to said first calling party device comprises the step of said user generating a text message using an input mechanism associated with said called party device.

9. The method recited in claim 8, further comprising the step of converting said text message to speech.

10. The method recited in claim 1, wherein said call links between said called party device and said calling party devices are established through a packet-switched communications network.

11. The method recited in claim 10 wherein said call links are established using an Internet Engineering Task Force (IETF) Session Initiation Protocol (SIP).

12. A communications device for receiving and controlling communications with at least two calling party devices by a user thereof, said communications device comprising:
   means for establishing a first call link between said communications device and a first calling party device;
   means for receiving a call request to said communications device from a second calling party device;
   means for placing said first call link on hold;
   means for accepting said call request from said second calling party device to establish a second call link between said communications device and said second calling party device;
   means for causing, through the selective activation by said user of said called party device, a message to be transmitted to said first calling party device, said means for causing a message to be transmitted to said first calling party device comprising means for said user of said communications device to select one of a plurality of predefined messages using an input mechanism associated with said communications device while said communications device is in communication with said second calling party device, whereby said user of said communications device can communicate information to a user of said first calling party device without interrupting communications with a user of said second calling party device.

13. The communications device recited in claim 12 wherein said message instructs said user of said first calling party device to hold.

14. The communications device recited in claim 12 wherein said message instructs said user of said first calling party device that said call link to said communications device will be disconnected.

15. The communications device recited in claim 14 further comprising means for automatically causing said first call link to be terminated.

16. The communications device recited in claim 12 wherein said message instructs said user of said first calling party device to leave a message.

17. The communications device recited in claim 16 further comprising means for automatically causing said first calling party device to be connected to a messaging system associated with said user of said communications device.

18. The communications device recited in claim 12, wherein said message comprises a prerecorded voice message.

19. The communications device recited in claim 12, wherein said means for causing a message to be transmitted to said first calling party device comprises means for said user of said communications device to generate a text message using an input mechanism associated with said communications device.

20. The communications device recited in claim 19, further comprising means for converting said text message to speech.

21. The communications device recited in claim 12, wherein said call links between said communications device and said calling party devices are established through a packet-switched communications network.

22. The communications device recited in claim 21, wherein said call links are established using an Internet Engineering Task Force (IETF) Session Initiation Protocol (SIP).

23. A method of controlling communications with at least two remote telephony devices by a user of a telephony device, said method comprising the steps of:

establishing a first call link between a first remote telephony device and said telephony device;

establishing a second call link between a second remote telephony device and said telephony device; and, while said first call link is on hold and said telephony device is in communication with said second remote telephony device, causing, through the selective activation by said user of said telephony device, a message to be transmitted to said first remote telephony device, said step of causing a message to be transmitted to said remote telephony device comprising the step of said user selecting one of a plurality of predefined messages using an input mechanism associated with said telephony device while said telephony device is in communication with said second remote telephony device, whereby said user of said telephony device can communicate information to a user of said first remote telephony device without interrupting communications with a user of said second remote telephony device.

24. The method recited in claim 23, wherein said message instructs said user of said first remote telephony device to hold.

25. The method recited in claim 23, wherein said message instructs said user of said first remote telephony device that said call link to said telephony device will be disconnected.

26. The method recited in claim 25, further comprising the step of automatically causing said first call link to be terminated.

27. The method recited in claim 23, wherein said message instructs said user of said first remote telephony device to leave a message.

28. The method recited in claim 26, further comprising the step of automatically causing said first remote telephony device to be connected to a messaging system associated with said user of said telephony device.

29. The method recited in claim 23, wherein said message comprises a prerecorded voice message.

30. The method recited in claim 23, wherein said step of causing a message to be transmitted to said first remote telephony device comprises the step of said user generating a text message using an input mechanism associated with said telephony device.

31. The method recited in claim 30, further comprising the step of converting said text message to speech.

32. The method recited in claim 23, wherein said call links between said telephony device and said remote telephony devices are established through a packet-switched communications network.

33. The method recited in claim 32, wherein said call links are established using an Internet Engineering Task Force (IETF) Session Initiation Protocol (SIP).

* * * * *